Figure 1:
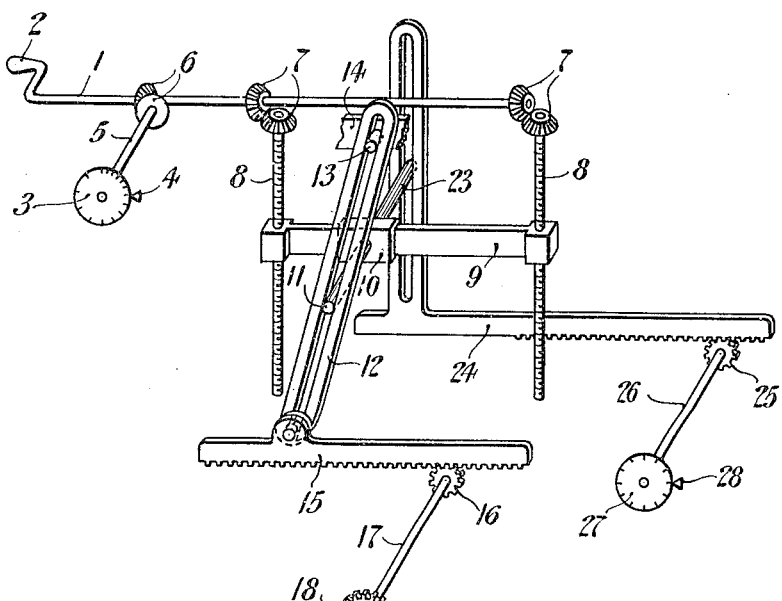

April 2, 1946.  E. P. ROSS  2,397,811
COMPUTING APPARATUS

Original Filed July 21, 1928

INVENTOR
Elliott P. Ross
BY Moakley & Gill
ATTORNEYS

Patented Apr. 2, 1946

2,397,811

UNITED STATES PATENT OFFICE 2,397,811

COMPUTING APPARATUS

Elliott P. Ross, Forest Hills, N. Y., assignor to Ford Instrument Company, Inc., Long Island City, N. Y., a corporation of New York Application July 21, 1928, Serial No. 294,435
Renewed February 26, 1934

4 Claims. (Cl. 235—61.5)

This invention relates to apparatus for computing the product of two quantities, one of which varies as a direct function of a third quantity and the other of which varies as an inverse function of the third quantity.

While the invention is of general utility it is particularly adapted for computing predicted angular positions of a target for use in aiming ordnance. By way of illustration such an application is disclosed herein. In this case the predicted angular position of a target depends upon the rate of change of angular position which is a minimum when the range is a maximum and upon the time of flight of a projectile which is a maximum when the range is a maximum. In other words, the rate of change of relative angular position and the time of flight of a projectile vary as inverse functions of each other.

Heretofore it has been the practice in computing predicted angular positions of a target to multiply the rate of change of relative angular positions of the target by the time of flight of the projectile to the target. Apparatus operating in accordance with this method has been employed. In general such apparatus consists of a member displaceable in accordance with the rate of change of angular position and another member displaceable in accordance with the time of flight corresponding to the range of the target, these members coacting to actuate an element in accordance with their product to give the relative angular movement of the target during the time of flight of a projectile.

In such apparatus both of the members must be of sufficient magnitude to take care of the maximum values of the quantities which they represent. These quantities, however, vary inversely with respect to each other, so that for consistent values of these quantities the resulting movement of the element representing their product is small and there is a consequent lack of accuracy in its indications. Furthermore apparatus operating in accordance with the method described above is not theoretically correct because it fails to take account of changes in the relative angular rate during the time of flight and it is not mechanically efficient due to its lack of accuracy.

It is an object of this invention to provide apparatus for computing the product of two quantities, one of which varies as a direct function of the third quantity by dividing the first quantity by the third quantity and multiplying the quotient by the product of the second quantity and the third quantity. Apparatus embodying the invention possesses the advantage of being mechanically efficient because it solves the problem presented by causing sufficient movement of the element representing the answer to give a much higher degree of accuracy than is obtainable with apparatus operating in accordance with the prior method.

When the invention is employed for computing predicted angular positions of a target the lateral component of the movement of a target expressed in units of linear measure is multiplied by the time of flight of a projectile divided by its advance range, that is, the range for which the projectile must be fired to strike or burst at the target. The apparatus possesses the further advantage of being substantially correct theoretically as it takes account of changes of relative angular rate during the time of flight.

To show clearly the object and advantages of the invention over the prior method it will be described in connection with the accompanying drawing in which Fig. 1 represents in simplified form the elements of a form of calculating mechanism heretofore operated in accordance with the prior method, but which by appropriate changes may embody the present invention.

Figure 2:
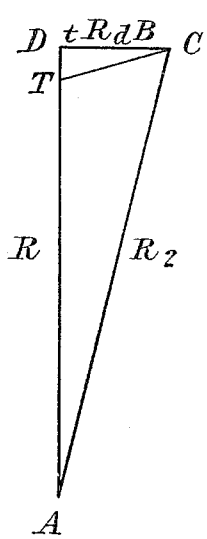

Fig. 2 is a diagram for use in connection with an explanation of the invention.

In Fig. 1, 1 represents a shaft provided with a crank 2 by which it may be turned in accordance with a desired input as shown by a dial 3 reading against a pointer 4 and connected to the shaft 1 by a shaft 5 and bevel gears 6. By two pairs of bevel gears 7 the shaft 1 drives two screws 8 threaded through the ends of a bar 9 carrying a slidable carriage 10. A pin 11 projects forwardly from the carriage through a slotted arm 12, the upper end of which is held by a pin 13 projecting from a fixed frame 14.

The lower end of the arm 12 is pivotally attached to a rack 15 meshing with a pinion 16 on the end of a shaft 17 carrying a gear 18 meshing with a pinion 19 attached to a crank 20. The other end of the shaft 17 carries a dial 21 readable against an index 22 to show the value of another input applied to the apparatus.

Projecting rearwardly from the carriage 10 is a pin 23 in line with the pin 11 and passing through the slotted vertical arm of a rectangular slide 24, the horizontal arm of which is provided with a rack meshing with a pinion 25 on a shaft 26 which also carries a dial 27 readable against an index 28 to give the output of the apparatus.

When the apparatus described above is employed in accordance with the prior method of computing predicted angular positions of a target the dial 3 will be graduated in units of range R and it may be assumed that these graduations are unequally spaced in accordance with the variable relation between time of flight $t$ and range so that when the dial is set for a particular range the movement imparted to the bar 9 through the bevel gears 7 and screws 8 will be in accordance with the corresponding time of flight of a projectile. This bar then corresponds to a member displaceable in accordance with the time of flight, as referred to in the introduction of this specification.

The rate of change of relative angular position $dB$ of the target is applied to the apparatus by manipulation of the crank 20 until the desired value is shown by the dial 21 against the index 22. This movement will through pinion 19 and gear 18, shaft 17, pinion 16, and rack 15 be imparted to the arm 12 to produce through the pin 11 a movement of the carriage 10 on the bar 9. The pin 23 will thus be displaced in accordance with the product $tdB$ of the time of flight and the rate of change of relative angular position and will correspondingly move the slide 24 to turn the dial 27 through pinion 25 and shaft 26 to show against the index 28 the predicted angular movement of the target during the time of flight.

The inefficiency of the apparatus when arranged as above described may be most clearly illustrated by selecting certain typical values of the quantities involved and assuming certain dimensions for the parts of the apparatus. For this purpose a minimum range of 2400 yards and a maximum range of 35,000 yards will be considered. Assuming the time of flight for the minimum range to be 2.5 seconds and for the maximum range 85 seconds, that the observing station is fixed and the target has a speed of 80 knots at right angles to the line of sight, the angular velocity for the minimum range will be 1.077° per second and for the maximum range 0.074° per second. For the minimum time of flight of 2.5 seconds this will mean an angular movement of 2.69° and for the maximum time of flight an angular change of 6.28°.

Assuming that the screws 8 have an effective length of 10 inches to take care of the maximum values of time of flight and the rack 15 a length of 5 inches to take care of the maximum value of the rate of change of angular position the movement of the slide 24 for the minimum range will be 0.147 inch in one direction or the other while for the maximum range the movement will be 0.342 inch in one direction or the other. This relatively small movement of the slide 24 under both minimum and maximum range conditions results from the fact that when the range is a minimum, time of flight is a minimum and the pin 11 is relatively close to the pin 13 so that even with the maximum displacement of the slide 15 which occurs under these conditions there will be a relatively small displacement of the slide 24. When the range and time of flight have maximum values the pin 11 will occupy a position near the bottom of the slot in the arm 12 but as the rack 15 under these conditions has a small displacement there will be a relatively small displacement of the slide 24.

It has already been stated that for the maximum range condition there will be a displacement of the slide 24 of 0.342 inch. This corresponds to an angular prediction of 6.28° so that $1/100$ of an inch of movement of the slide represents 0.184° or approximately 11'. This illustration gives an idea of the lack of accuracy of the apparatus.

When the apparatus is arranged in accordance with this invention the dial 3 is graduated to show the advance range, designated $R_2$, as computed or determined by some other instrument and the graduations are unequally spaced in accordance with the varying relation between advance range and time of flight so that the bar 9 is positioned for any particular setting of the dial 3 in accordance with the time of flight divided by the advance range or in accordance with the factor $$\frac{t}{R_2}$$

In the arrangement now under consideration the rack 15 is displaced in accordance with the lateral component of the rate of movement of the target which is the same regardless of the range of the target so that there is always a comparatively large movement of the rack 15 whether the range is a minimum or a maximum and there is a corresponding increased movement of the slide 24. The lateral component of the rate of movement of the target equals the present range R times the angular rate of change of bearing $dB$ or the factor $RdB$. For the minimum range of 2400 yards the quantity $$\frac{t}{R_2}$$

will have a value of 0.00104 while for the maximum range of 35,000 yards it will have a value of 0.00243.

In Fig. 2 the line A—T represents in direction and magnitude the line of sight and the range R respectively from an observing station A to a target at T. The line T—C represents in direction the course of the target and in magnitude the movement of the target during the time of flight of a projectile. The line A—C therefore represents the advance range $R_2$ of the target. The line D—C represents the lateral component of the movement of the target and its value is represented by $tRdB$. The prediction angle is DAC and its sine is $$\frac{tRdB}{R_2} \text{ or } \frac{t}{R_2} \times RdB$$

Since the angles are small this may be considered as a measure of the angle instead of the sine of the angle. Therefore in the apparatus the bar 9 is displaced in accordance with the factor $$\frac{t}{R_2}$$

while the rack 15 is displaced in accordance with the factor $RdB$ so that the resultant movement of the slide 24 is in accordance with the prediction angle.

For the purpose of showing the higher accuracy of the apparatus when operating in accordance with this invention the same speed of the target at right angles to the line of sight, the same minimum and maximum range values and times of flight and the same dimensions of the elements of the apparatus will be used, but for simplicity it will be assumed that the carriage 9 is displaceable in accordance with $$\frac{t}{R}$$

instead of $$\frac{t}{R_2}$$

as in the actual apparatus.

For the minimum range of 2400 yards $$\frac{t}{R}$$

will have a value of 0.00104 and for the maximum range of 35,000 yards it will have a value of 0.00243. For the maximum value the pin 11 will lie at the bottom of the slot in arm 12 and since the screws 8 are 10 inches long the pin will lie about 4 inches from the pin 13 corresponding to the zero point of the movement of the pin 11. Therefore even for the minimum range there will be a substantial movement of the slide 24 for even under these conditions the rack 15 will have considerable movement since, as explained above, the lateral component of the rate of movement of the target is the same regardless of the range of the target.

For the maximum range the movement of the answer slide 24 which represents the quantity $$\frac{t}{R} \times RdB$$

corresponds to 6.28° and since under these conditions the pin 11 is at the bottom of the slot in arm 12 the movement of this slide is the same as that of rack 15, or in other words 5 inches under the assumption of the length of the rack to take care of maximum conditions. This means that 1/100 of an inch of movement of the slide 24 corresponds to 0.0125° or approximately 0.75', whereas in the apparatus as arranged in accordance with the prior method a similar movement of the slide 24 represents approximately 11'. Based on these figures then the present arrangement is approximately 14½ times as accurate as the prior method.

By assuming the value of $$\frac{t}{R_2}$$

instead of $$\frac{t}{R}$$

which was used above for the sake of simplicity the apparatus will be even more accurate because it will then take account of the changes of relative angular rate of the target during the time of flight of the projectile, which has been explained is not taken into account in the prior method.

While the invention has been specifically shown and described for the purpose of computing predicted angular positions of a target, it will be understood that it may be employed for computing the product of any two quantities, one of which varies as a direct function of a third quantity while the other varies as an inverse function of the third quantity. It will also be understood that various changes may be made in the structural details of the apparatus without departing from its principle as defined in the appended claims.

I claim:

1. In apparatus for computing the predicted angular movement of a target, the combination of a member displaceable in accordance with the quotient of the time of flight of a projectile divided by its advance range, a member displaceable in accordance with the lateral component of the rate of movement of the target and an element jointly acted upon by said two members and displaced thereby in accordance with the product of their displacements.

2. In apparatus for computing the predicted angular movement of a target, the combination of a member settable in accordance with the advance range of a target, a second member associated with the first member so as to be displaced in accordance with the quotient of the time of flight of a projectile divided by the advance range, a third member settable in accordance with the lateral component of the rate of movement of the target and an element displaceable in accordance with the product of the movements of the second and third members.

3. In apparatus for computing the predicted angular movement of a target, the combination of a member settable in accordance with the advance range of the target and having graduations unequally spaced in accordance with the varying relation between advance range and time of flight, a bar, connections between the member and the bar whereby the latter is adjustable in accordance with the time of flight divided by the advance range, a carriage on the bar, a pivoted arm, a pin mounted on the carriage and coacting with the arm, said pin being adapted to lie near the pivot point of the arm for minimum values of range and remote therefrom for maximum values of range, a member connected to the free end of the arm, means for displacing the last mentioned member in accordance with the lateral component of the rate of movement of the target and an output element connected to the carriage and displaceable thereby in accordance with the product of the time of flight divided by the advance range and the lateral component of the rate of movement of the target.

4. In an apparatus for computing the predicted angular movement of a target, the combination of a member displaceable in accordance with the quotient of the time of flight of a projectile divided by its range, a member displaceable in accordance with the lateral component of the rate of movement of the target and an element jointly acted upon by said two members and displaced thereby in accordance with the product of their displacements.

ELLIOTT P. ROSS.